March 8, 1932. R. V. HUTCHINSON ET AL 1,849,008
THERMAL CONTROL OF COOLING
Filed March 27, 1929 3 Sheets-Sheet 2

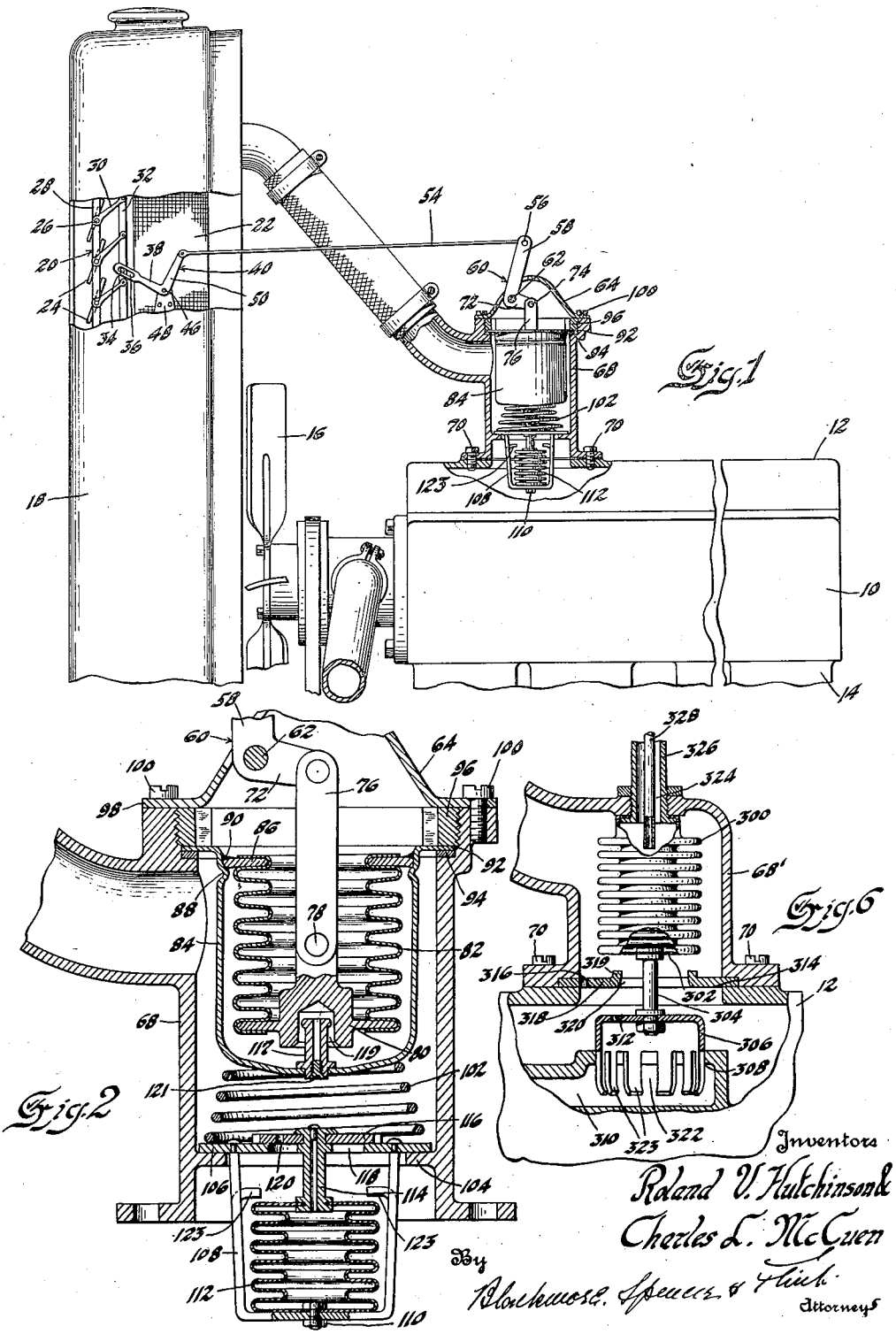

Inventors
Roland V. Hutchinson &
Charles L. McCuen
By
Attorneys

March 8, 1932. R. V. HUTCHINSON ET AL 1,849,008
THERMAL CONTROL OF COOLING
Filed March 27, 1929 3 Sheets-Sheet 3
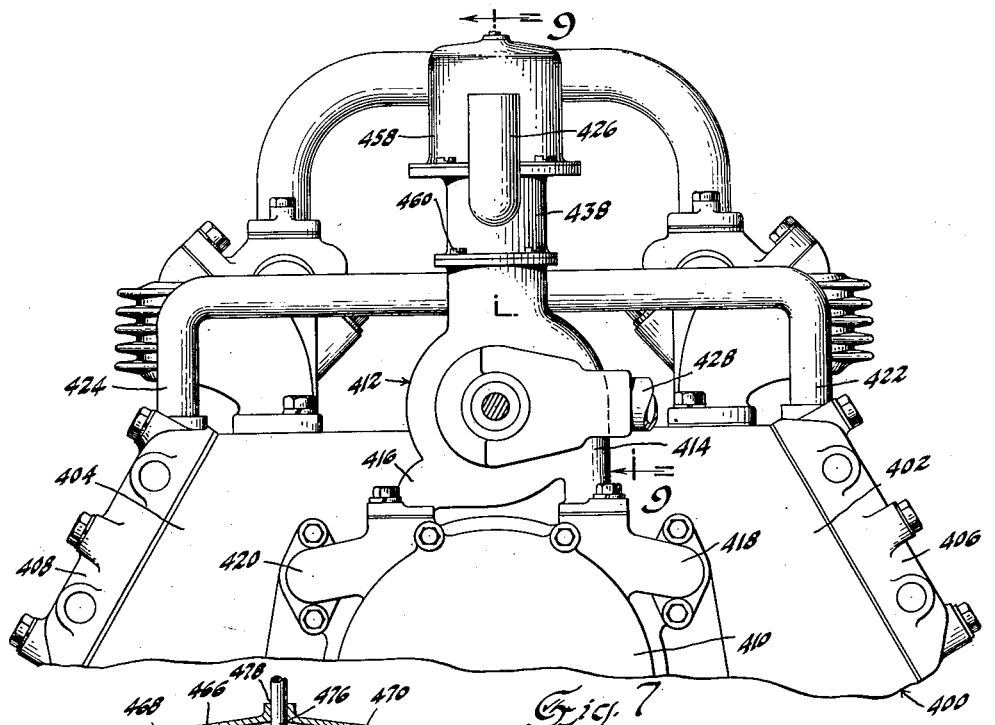
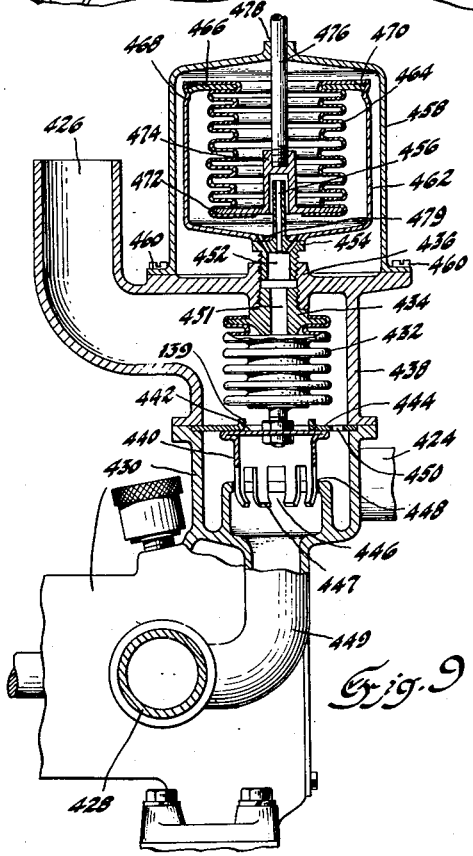
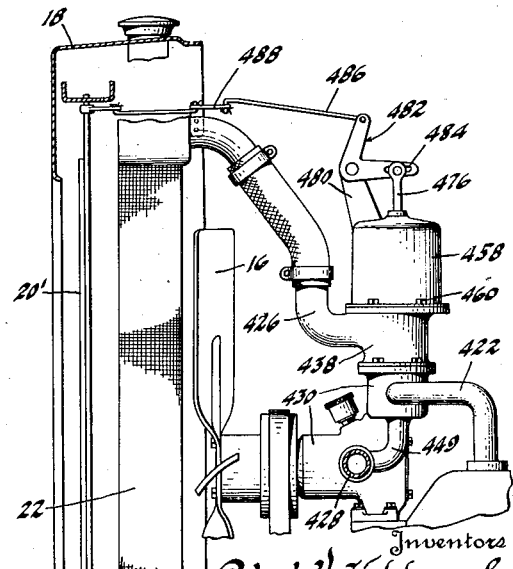
Inventors
Roland V. Hutchinson &
Charles L. McCuen
By
Blackmore, Spencer & Fisch
Attorneys Patented Mar. 8, 1932

1,849,008

UNITED STATES PATENT OFFICE

ROLAND V. HUTCHINSON AND CHARLES L. McCUEN, OF LANSING, MICHIGAN, ASSIGNORS TO GENERAL MOTORS CORPORATION, OF DETROIT, MICHIGAN, A CORPORATION OF DELAWARE

THERMAL CONTROL OF COOLING

Application filed March 27, 1929. Serial No. 350,323.

This invention relates to cooling systems and has particular reference to a device or means to control the temperature of the water in the cooling system of internal combustion engines and is particularly adapted for use on automotive vehicles.

The invention relates to internal combustion engines using a means to control the air flow through the radiator, said means usually being in the form of a blade type of shutter. It is known to operate these shutters either by hand or to control them automatically by means of a thermostatic element subject to control by the temperature of the water cooling system of the engine. The present invention relates to devices of the latter kind and there are illustrated on the accompanying drawings several types applicable to the straight and V type internal combustion engines. In each instance a thermostatic element is mounted so as to be subject to the heating effects of the water in the engine circulating system and as the water heats up, the rise in temperature will cause the volatilization of the readily vaporizable liquid which either expands or contracts a thermostat preferably in the form of a bellows, and the movement of the thermostat operates a suitable linkage which is connected to and operates the shutter blades so as to allow a more or less amount of cooling air to flow through the radiator, as the temperature of the engine cooling liquid varies.

In one form of the invention the thermostat is mounted in a special type of casting applied at the water outlet from the engine to the radiator so that the thermostatic element is subjected to the effects of the hottest part of the water in the circulating system. This thermostat is mounted in an impervious cup which contains a highly volatile fluid such as ether or a mixture of alcohol and carbon tetrachloride. As the fluid in the cup vaporizes and expands it will contract the thermostat which will operate a suitable linkage connected to and operating the shutter blades. At the same time a second thermostat controls the flow of water to the first and prevents the flow until the temperature has risen to a degree sufficient to expand the second thermostat to open the valve. The function of this latter thermostat and valve is to prevent the circulation of water through the radiator until it has reached a temperature consistent with an efficient operation of the engine. By a suitable arrangement of passages the water may be made to circulate directly through the engine block until the desired temperature has been reached.

In a second modification of the invention a bulb or receptacle containing an easily volatilized fluid is secured at any suitable portion of the engine but preferably near the rear end thereof, and is connected by means of a relatively large pipe or conduit with a chamber containing a bellows. This chamber is preferably rigidly mounted at the dash and is preferably though not necessarily enclosed in a non-heat conducting housing to protect it from the effects of outside temperature. As the fluid in the pump vaporizes and expands, it will contract the bellows and operate the Bowden wire or the linkage which is connected to and operates the shutter. The large connecting pipe or conduit is to allow for the easy and ready return of condensed fluid to the bulb or receptacle.

A third modification makes use of a thermostat preferably positioned at the front of the engine and having connected thereto a suitable valve. When the water of the circulating system is cold the valve is positioned so that the water will not circulate through the radiator but directly through the engine and as the water heats up it will expand the thermostat and move the valve so as to cause the water to circulate through the radiator and prevent its direct circulation through the engine. The expansible fluid in the thermostat is connected by a system of concentric pipes with a bellows suitably mounted at any convenient place, but preferably at the dashboard of the vehicle and as the fluid in the thermostat expands it will contract the bellows, which contraction will move a suitable linkage connected to and operating the shutter. The purpose of the concentric pipe is to allow an easy and ready return of condensed fluid.

As a modification of the two above referred to species, the valve of the first may be combined with the thermostatic arrangement of the second so that a single thermostat will operate the valve and linkage.

A fourth modification of the invention relates to its installation on a V type internal combustion engine. A V type engine brings in additional complications, due to the fact that there are two banks of cylinders to be cooled. This necessitates additional piping in the water circulating system and a proper inter-relation thereof so that a single thermostat may control both the water flow and the operation of the linkage to the shutter.

Referring to the drawings:

Fig. 1 shows a side view of so much of an internal combustion engine and its radiator as is necessary to illustrate the invention, with parts broken away and shown in section for purposes of clearer illustration.

Fig. 2 is an enlarged view of the thermostat and inter-related parts of Fig. 1.

Fig. 6 is a sectional view corresponding to Fig. 2 of a fourth modification which combines the modifications of Figs. 1 and 4.

Fig. 7 is a front view of a V type internal combustion engine showing the installation of a further modification.

Fig. 8 is a side view of the structure shown in Fig. 7.

Fig. 9 is a section taken substantially on the line 9—9 of Fig. 7.

Figure 3:
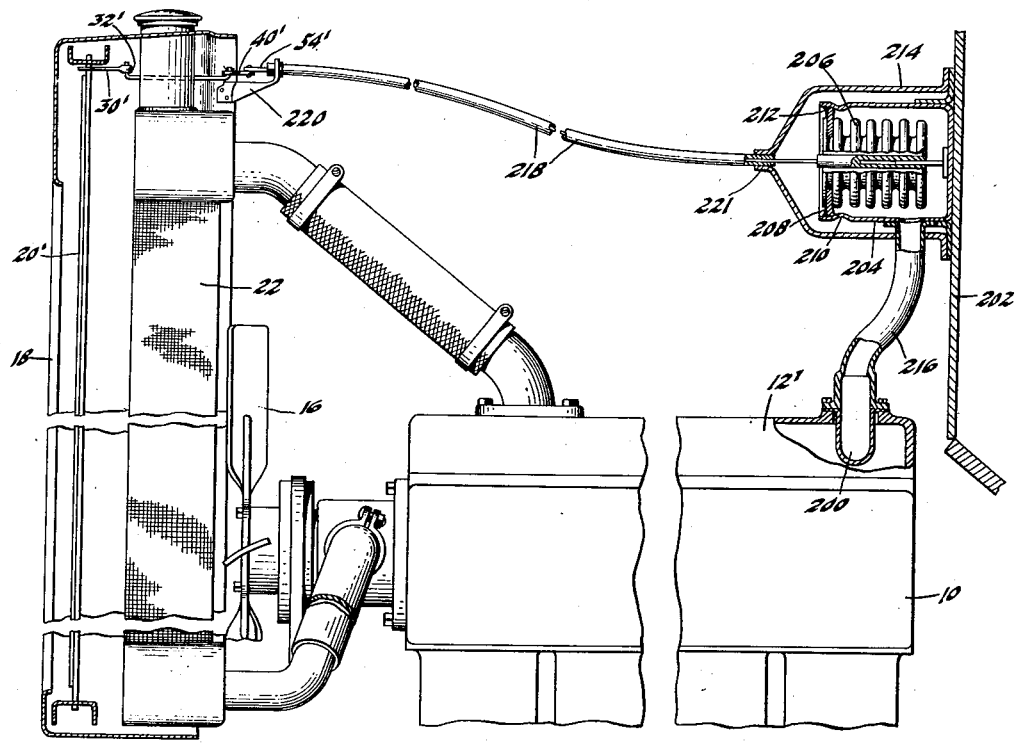
Fig. 3 is a view corresponding to Fig. 1 of a second modification.

Referring to the drawings, the numeral 10 indicates the cylinder block of an internal combustion engine, 12 the cylinder head, 14 the crank case, 16 the fan, 18 the radiator having the usual upper and lower tanks, and 20 a shutter positioned in front of the core 22 to control the flow of air therethrough. The shutter comprises the blades 24 pivoted as at 26 to a bar 28 secured in any suitable way but preferably to the side portion of the radiator shell. To each pivotal portion 26 there is connected an arm 30, the rear ends of which are pivoted to a movable rod 32, connected by means of a pin 34 operating in a slot 36 in the end of the arm 38 of the bell crank lever 40, pivoted as at 46 to the bracket 48, fastened to the inner side of the radiator shell. The second arm 50 of the bell crank lever 40 has pivoted thereto the end of a rod or wire 54, the opposite end of which is pivoted as at 56 to a relatively long arm 58 of the bell crank lever 60, pivoted as at 62 to the cap portion 64 of a dome shaped casting 68, secured by means of the screw bolts 70 to the cylinder head 12. The second arm 72 of the bell crank lever 60 is pivoted as at 74 to a link 76, the opposite end of which is pivoted as at 78 to the end member 80 of an expansible and contractible bellows type thermostat 82.

The thermostat 82 is mounted inside the imperforate cup 84 by means of the disc or plate 86 rigidly secured in the cup by means of the head 88 and the solder 90. If desired, the disc 86 may be secured in any other way such as by brazing or welding or by a ring screw threaded into the upper portion of the cup 84. A cup 84 has the flange 92 which rests on a gasket 94 seated on a shoulder formed at the upper portion of a dome or casting 68. A screw threaded ring 96 screws into the upper portion of the dome and rigidly holds the cup in the casting 68 in liquid tight relation. The cap 64, it is to be noted, is secured to the dome by means of the peripheral flange 98 and the machine screws 100.

Seated on an annular flange 104 and beneath a spring 102 is a flat plate 106 which has riveted thereto the end of a U-shaped saddle 108, to the lower portion of which there is secured by means of the bolt and nut 110 the expansible and contractible bellows type thermostat 112. The bellows 112 has secured to its opposite end the neck portion 114 to which there is connected the flat valve 116 which controls the opening 118 in the plate 106 and acts as a flow control for the water from the engine to the upper portion of the radiator. The valve 116 is provided with a bleed hole 120 which will always permit a small amount of water to flow through the engine and past the cup 84 to the radiator. Lugs 123 formed on the saddle 108 keep the bellows 112 from expanding too far.

The coil springs 102 is held in position by means of an annular flange 104 inside a dome and presses upwardly against the cup 84 and downwardly against the plate 106 to hold the second thermostat in position although this spring is not necessary and in practice is preferably omitted, for the reason that the plate may be tightly fitted or rigidly secured in the dome.

The operation of the structure of Figs. 1 and 2 is as follows: When the engine is started and the water pump is working, the circulation will be restricted through the engine until the water is heated to a sufficient degree to expand the thermostat 112 to move the valve 116 from its seat and permit the water to flow into the dome 68 past the cup 84 through the outlet pipe and into the upper tank of the radiator. As the heated water flows past the cup 84 the heat will cause the volatile fluid in the cup to vaporize and expand, and will compress or contract the thermostat 82 and move the link 76 upward. This upward movement will swing the bell crank lever and operate the rod 54 toward the left to open the shutters, when considering the structure of Fig. 1. The greater the amount of heating of the water the more will be a volatilization of the fluid in the cup 84 and the greater the contraction of the bellows 82. This will cause the correspondingly greater swing of the bell crank 60 and a larger movement of the rod 54 to thereby open the shutter blades 20 to a greater extent and permitting a larger amount of air to flow through the radiator core and cool the circulating water. As the water in the system cools the expansible liquid in the cup 84 will condense and contract to thereby allow the expansion of the thermostat 82 and reversing the movement of the linkage to move the blades 20 to closed position.

The cup 84 has the tubular member 117 secured at its bottom and extending inwardly of the cup into a recess 119 in the end plate 80. This tubular member is closed by a plug 121 threaded and soldered thereinto. The purpose of this construction is to allow for a filling opening and also to serve as a means to interconnect the interior of the thermostats 82 and 112. When these thermostats are connected the thermostat 112 and its valve 116 are inverted, the valve then moving downwardly away from the flange 104 (which may be positioned lower in the casting 68) to open position. The neck 114 may, of course, be of a suitable length to accommodate the structure. (See Fig. 9 for one method of interconnecting two bellows.)

Referring to the species of Fig. 3, it will be seen that the conventional shutter blades 20' have been provided. These shutter blades are vertically instead of horizontally mounted and are operated by means of arms 30' connected to a movable bar 32' suitably connected by a pin and slot connection to the longer arm of a bell crank lever 40', the second arm of which is pivotally connected to the end of a Bowden wire 54'.

A bulb or receptacle 200 is mounted in the engine block and preferably in the head 12" at the rear end thereof where it will be subject to the temperature of the water of the cooling system. This bulb contains a suitable fluid which has the property of easy and ready volatilization.

A liquid tight cup or container 204, having mounted therein the expansible and contractible bellows 206, is mounted at any suitable place such as the engine block or at the dash 202 of the automotive vehicle to which the invention is applied. The bellows is secured in the cup 204 by means of the end disc 208 which is mounted in fluid tight relation by means of the annular indentation 210 and the solder 212. Any other means than solder, such as brazing or welding or a screw threaded ring may be used to hold the plate 208 in place. The cup is surrounded by a casing 214 which is preferably, though not necessarily, so constructed to insulate from heat so as to protect the bellows from the effects of the outside temperature. It may be asbestos lined or covered, or composed of a heat insulating material such as hard rubber.

A relatively large pipe or cup 216 connects the bulb or receptacle 200 with the interior of the cup 204 in liquid tight relation, which permits the fluid vapor from the bulb 200 to pass up into the cup 204 and exert its pressure on the bellows 206 to cause its contraction. As the expansible liquid cools it will condense and return through the pipe 216 to the bulb 200, permitting the bellows 206 to again expand. The expansion and contraction of the bellows 206 will reciprocate the Bowden wire 54' which is enclosed in the casing 218 which casing is rigidly secured at its front end to a bracket 220 on which the bell crank 40' is mounted, and at its rear end in the neck portion 221 of the casing or housing 214. The reciprocation of the Bowden wire will open and close the shutter 20'.

The operation of the structure of Fig. 3 is as follows: As the water in the water circulating system heats up it will communicate its heat to the expansible fluid in the bulb 200, which will volatilize and pass up through the pipe 216 into the chamber between the cup 204 and bellows 206. The pressure will cause the contraction of the bellows and the forward movement of the Bowden wire 54'. The movement of the wire will be communicated to the bell crank 40' which in turn will operate the bar 32' to swing the shutter blades 20' to their open position. When the water in the circulating system cools down the volatile fluid will also cool and condense which will permit the expansion of the bellows 206 which will pull the Bowden wire 54' to the rear and bring about a closing of the shutter blades 20'.

Figure 4:
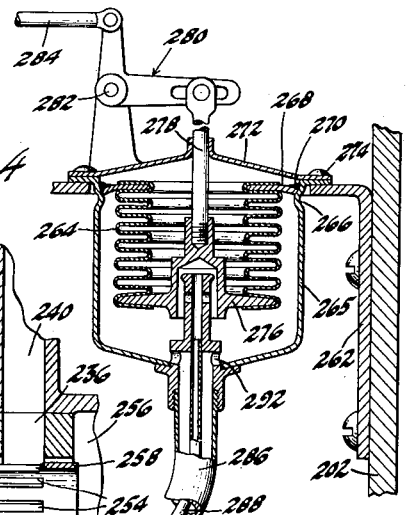
Figs. 4 and 5 are separated sectional views of a third modification.
Figure 5:
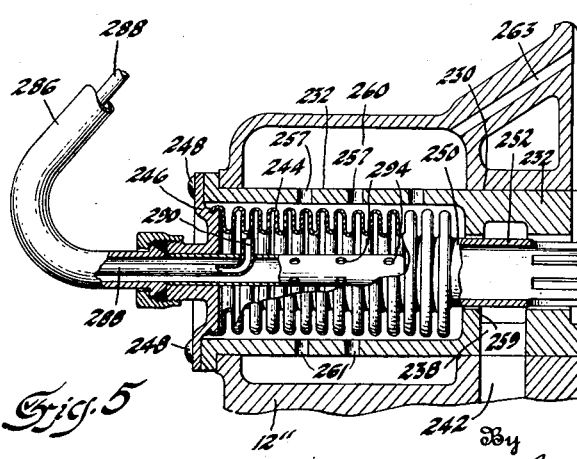

Referring to the species of Figs. 4 and 5, a portion of the engine block or cylinder head is indicated at 12". The portion shown is preferably at the front of the engine although it may be at any other suitable point. The engine block is provided with an opening 230 into which there is received a shell or hollow plug 232 which conforms to the shape of the opening and is fastened by the screws or bolts 248. The member 232 is hollow and has the lateral openings 236 and 238 which conform respectively to the passages 240 and 242 in the engine block to allow for the flow of cooling water of the cooling system. The passage 240 leads to the upper tank of the radiator.

Inside the bore of the shell 232 a bellows type thermostat 244 is spun and soldered to the closure or cap piece 246 which is held on to the shell 232 and engine block 12" by means of the same machine screws 248. The inner end 250 of the thermostat has secured thereto the hollow reciprocable valve 252 which is provided with the circumferential ports 254. The thermostat 244 is filled either completely or partially with any suitable readily volatile liquid such as ethyl ether and as it expands it will move the valve 254 therewith. In the position of the parts shown in Fig. 5, the thermostat is expanded and the cooling water of the engine circulating system will pass from the water passage at 256 into the hollow end of the valve, through the ports 254, into the passage 240, and on to the radiator. This is the normal or heated working condition of the engine. When the water is cool the thermostat 244 is contracted which will move the valve 252 to the left and cause the end portion 258 to close the opening 236 and bring the ports 254 into mating relation with the opening 238. In this new position of the parts the water in the engine circulating system will flow from the space 256 through the hollow valve ports 254 into the opening 238 and out through the passage 242 into the cylinder block. This will cause the recirculation of the water directly through the cylinder block until the water is heated to the desired temperature. When the water heats up the circulation thereof through the circulating space 260 about the thermostat 244 will cause the heating of the fluid in the thermostat and its expansion to move the valve to the position shown in Fig. 5. The valves 252, it will be noted, are spaced somewhat from the shell 232 as shown at 259 to allow some water to flow to the space 260 and to the radiator at all times and prevent sticking.

Holes 257 and 261 are provided in the sides of the shell 232 to permit of a ready circulation of water about the thermostat 244. A small bleed hole or passage 263 is also provided between the space 260 and the passage 240 to allow for the escape of any steam that may collect in the space.

Rigidly mounted at the dash 202 by means of the suitable bracket 262 is the cup shaped member 265 housing an expansible and contractible bellows 264. The bellows is secured inside the cup in liquid tight relation by means of the bead 266 upon which there rests the ring or plate 268 secured to the upper fold of the bellows in liquid tight relation and soldered in place as indicated at 270. A cover or cap 272 closes the cup and is secured thereto by means of the rivets or machine screws 274.

The opposite end of the bellows is closed by means of the plate 276 and to this plate there is secured the rod 278, the end of which is forked and provided with a pin which operates in a slot in one arm of the bell crank lever 280. The bell crank lever is suitably pivoted at 282 and has pivoted to its second arm the rod 284 which leads to the shutter to operate the same in a manner shown in Figs. 1 or 3.

A pipe 286 of relatively large diameter connects the interior of the thermostat 244 with the interior of the cup 265 in liquid tight relation and passing centrally through this pipe and spaced therefrom is a second pipe or tube 288. The function of these two tubes is to allow the vaporized fluid from the thermostat 244 to expand and pass upwardly through the inner tube 288 to the cup and permit the condensed liquid to return to the thermostat through the outer tube 286. If desired, but a single large tube may be used, similar to the tube 216 in Fig. 3, but the dual pipe system is preferable for long distance control. By referring to Fig. 5 it will be noted that the end 290 of the tube 288 inside the thermostat 244 is upwardly bent so that its end will be at the highest point in the thermostat to allow for the ready escape of vaporized or volatilized liquid from the bellows. On the other hand the outer tube at the cup 265 has the openings 292 at its lowermost portion and the delivery end of the inner tube 288 placed well upwardly within the cup so that the volatilized fluid or vapors may readily contract the bellows 264, and as they condense they will flow toward the openings 292 and return to the thermostat 244. If desired the tube 286 inside the thermostat may be provided with a plurality of openings 294.

The operation of the structure of Fig. 5 has been previously described. Considering the structure of Fig. 4, in which the bellows 264 is shown expanded, it is to be noted that when the liquid in the thermostat 244 vaporizes it will rise in the tube 288 to the space between the bellows 264 and cup 265 where the pressure will contract the bellows and move the rod 278 upwardly. This upward movement of the rod 278 will swing the bell crank lever 280 and cause the movement of the rod 284 to the left to open the shutter. When the water in the circulating system cools and the vapor in the thermostatic system condenses, the bellows 264 will expand and pull the rod 278 downward and operate the shutter linkage in the opposite direction to close the shutter.

While we have shown the structure of Fig. 4 as mounted at the dash, it is nevertheless within the scope of the invention to secure the cup 265 to the engine block or to any other suitable portion of the vehicle to which the invention is applied.

Referring to the structure of Fig. 6, it will be seen that there has been combined the thermostatic means of the species of Figs. 2 and 4 to form a further modification in which only one thermostat is used. The numeral 68′ indicates a dome or casting secured to the cylinder block 10 or cylinder head 12 by means of screws 70. Inside the casting or dome 68′ there is rigidly mounted at one of its ends the bellows type thermostat 300 which contains a liquid which is easily volatilized or vaporized. The opposite end 302 of the thermostat is free and has secured thereto the rod 304 on which is rigidly mounted the valve 306 which controls the flow of water through the opening 308 to an auxiliary passage 310 in the engine block, and through an opening 320 in a valve seat 314. The valve 306 is provided with a small bleed opening 312 to always permit the circulation of a small amount of water into the dome 68' when the valve is on its seat 314. An opening 316 in the disc 318 (which forms the valve seat) also allows for the passage of a small amount of water at all times. In the expanded position of the thermostat as shown in Fig. 6, the valve 306 closes the opening 308 and compels the circulation of the water through the dome 68' and into the upper tank of the radiator. The disc 318 has the lugs or prongs 319 to limit the expansion of the thermostat 300. When the bellows is contracted the flat portion of the valve 306 seats over the opening 320 in the disc 318 and closes the same and at the same time opens the passage 310 by causing the spaces 322 between the tines 323 at the lower portion of the valve to rise above the upper portion of the opening 308 to permit the circulation of the water from the water circulating space 323 through the spaces 322 and into the passage 310 to cause the direct circulation of the water through the engine block and cutting out the radiator.

The thermostat 300 is open at its upper end as shown at 324 and has secured thereto in liquid tight relation the outer relatively large tube 326 within which there is received the smaller inner tube 328 which leads to a unit such as is shown in Fig. 4. The function and operation of the tubes 326 and 328 is the same as the tubes 286 and 288 described in the species of Figs. 4 and 5.

Referring to the species of Figs. 7, 8 and 9, it will be seen that the thermostatic controlled shutter operating mechanism of the invention has been applied to a V type internal combustion engine. The application of devices of the present invention bring out different problems when applied to a V type engine than when applied to an engine having cylinders in line, due to the fact that a V type engine has two separate banks of cylinders and has a necessarily more complicated system of water cooling and of water circulation. In Fig. 7 the numeral 400 indicates a V type internal combustion engine having the multi-cylinder banks 402 and 404 provided with the cylinder heads 406 and 408 and the timing gear cover 410 on which is seated a water pump 412 of the centrifugal type having two outlets 414 and 416 which deliver the water into passages 418 and 420 formed in the timing gear cover. From the passages 418 and 420 the water flows into pipes which extend the length of the cylinder block and which have openings of progressively increasing size to suitably deliver the cooling water between the various cylinders.

The water leaves the cylinders of each bank by the means of pipes 422 and 424 to flow from the outlet 426 to the upper tank of the radiator. The pump in turn receives the water at its mid portion from the pipe 428 from the lower tank of the radiator.

The thermostatic device of the invention is mounted on the pump housing 430 and comprises the lower thermostatic bellows 432 rigidly mounted on the end plate 434 which is screw threaded into a boss 436 formed on one wall of a housing or casting 438. The free end of the bellows has secured thereto the valve 440 which controls the opening 442 in a plate 444 rigidly held between the pump housing 430 and the casting 438. The plate 444 is provided with a small bleed hole 450 to at all times permit a small portion of the water of the cooling system to flow into the chamber of the casting 438 and circulate around the thermostat 432, and also with lugs or prongs 139 to present excess endwise movement of the thermostat 432. In the position of the parts shown in Fig. 9 the water from the engine delivered by the pipes 422 and 424 will arrive at the upper portion of the pump housing 430 and flow from the openings or spaces 446 between the tines 447 at the lower portion of the valve 440, directly to the pump through the passage 449 to be recirculated through the engine. When the water in the circulating system heats up it will cause the liquid in the thermostat 432 to volatilize and expand the thermostat 432 which will push the valve 440 downwardly to gradually close the opening 448 leading from the upper portion of the pump housing to the pump. The water will now flow through the opening 442 and outlet 426 to the radiator.

As the liquid in the thermostat volatilizes, it will pass up through the passage 451 in the plate 434 and into the bore 452 of a stud 454 screw threaded into the stud 436 at the upper wall of the casting 438. The stud 454 has the tubular bored extension 456 which extends well upwardly into a mid portion of a housing 458, secured to the upper portion of the casting by means of the screws 460. Inside the housing 458 and positioned over the tubular extension 456 there is mounted the cup 462 which houses a bellows 464. The bellows is secured in the cup by means of the end plate 466 which rests on a bead 468 and is soldered as at 470 to rigidly hold it in liquid tight relation. The upper fold of the bellows is formed over the plate 466. The bottom the bellows 464 has secured thereto the end closure plate 472 which has a central bored cylindrical portion 474 for the purpose of receiving the cylindical extension 456 of the stud 454. A rod 476 screw threaded into the portion 474 extends upwardly through an opening 478 in the housing 458. As the volatilized fluid from the thermostat 432 arrives at the space between the cup 462 and bellows 464, the pressure will cause the bellows to contract and push the rod 476 upwardly. The cooling of the water in the circulating system will cause the condensation of the expansive fluid and its return to the thermostat through the openings 479 and bore 452, which will permit the bellows 464 to expand and pull the rod 476 in the opposite direction.

A bell crank lever 482, having a pin and slot connection 484 with the end of the rod 476 is pivotally mounted on an arm 480 secured to the housing 458. The opposite end of the bell crank is pivotally connected to a rod 486 which is connected by means of a suitable linkage 488 to the shutter 20′ to operate the same.

The operation of the construction shown in Figs. 7, 8 and 9 is as follows: Assume the parts to be in the position shown in Fig. 9, which is the position corresponding to the cooler temperature of the water of the engine circulating system. The engine is now started, its operation will heat the water and the pump will pull the water from the pipes 422, 424 into the upper portion of the pump chamber 430, through the spaces 446, opening 448 and into the lower pump chamber from where it will be delivered to the outlets 414 and 416 for transmission to the cylinders through the passages 418 and 420. A small portion of the water will at all times flow through the opening 450 in the disc 444, the heated water causing the gradual volatilization of the fluid in the thermostat 432 and bringing about its expansion and producing a downward movement of the valve 440 to push the valve from its seat and from the opening 442. This movement will tend to close the opening 448 and to accordingly diminish the flow of water therethrough and to correspondingly open the opening 442 to increase the flow of water to the radiator. When the thermostat approaches fully expanded position the opening 448 will be entirely closed preventing the recirculation of the water directly through the engine and compelling all the water to pass to the radiator around the thermostat 432 and into the outlet 426. The volatilized fluid in the thermostat will rise to the space between the cup 462 and bellows 464 and cause the contraction of the latter to push the rod 476 upwardly to operate the bell crank 482 and link 486 to swing the shutter 20′ to open position. When the water in the circulating system cools or as the vapor in the thermostatic system condenses a contraction of the thermostat 432 and an expansion of the bellows 464 will take place and bring about a reverse operation of the linkage described.

We claim:

1. In an air flow control device for the radiator and cooling system of an internal combustion engine, comprising means for controlling the flow of air through the radiator, a pump for circulating the cooling water, a housing mounted on said pump and through which the water flows from the engine to the radiator, thermosensitive expandible and contractible means permanently mounted on the walls of said housing and in direct contact with the water therein, and means directly connected to said thermosensitive means to operate said first named means.

2. In an air flow control device for the radiator and cooling system of an internal combustion engine, comprising means for controlling the flow of air through the radiator, a pump for circulating the cooling water, a housing mounted on said pump and through which the water flows from the engine to the radiator, thermosensitive expandible and contractible means mounted on the walls of the housing and positioned both on the inside and outside thereof and in direct contact with the water therein, and means connected to said thermosensitive means to operate said first named means.

3. In an air flow control device for the radiator and cooling system of an internal combustion engine, comprising means for controlling the flow of air through the radiator, a pump for circulating the cooling water, a housing mounted on said pump and through which the water flows from the engine to the radiator, thermosensitive expandible and contractible means mounted on the walls of the housing and positioned both on the inside and outside thereof and in direct contact with the water therein, a valve in said system connected to and moved by said thermosensitive means, a water flow passage controlled by said valve, said valve and passage controlling the delivery of water by the pump between the engine and radiator, and means connected to said thermosensitive means to operate said first named means.

4. In an air flow control device for the radiator and cooling system of an internal combustion engine, comprising means for controlling the flow of air through the radiator, a pump for circulating the cooling water, a housing mounted on said pump and through which the water flows from the engine to the radiator, thermosensitive expandible and contractible means mounted on the walls of the housing and positioned both on the inside and outside thereof, a valve connected to and controlled by said thermostatic means in said housing, a water flow passage controlled by said valve, said valve and passage controlling the delivery of water by the pump between the engine and radiator, and means connected to said thermosensitive means outside said housing to operate said first named means.

5. In an air flow control device for the radiator and cooling system of an internal combustion engine, comprising means for controlling the flow of air through the radiator, a pump for circulating the cooling water, a housing mounted to receive the water flowing from the engine, a passage connecting said housing and pump, a valve for controlling said passage and the delivery of water by the pump between the radiator and engine, thermosensitive means in said housing and connected to and operating said valve, a second thermosensitive means mounted on the housing on the outside thereof and subject to the temperature of the water, and means connecting said second thermosensitive means to operate said first named means.

6. In an air flow control device for the radiator and cooling system of an internal combustion engine, comprising means for controlling the flow of air through the radiator, a pump for circulating the cooling water, a housing mounted in the path of flow of the water from the engine, interconnected thermosensitive means mounted on the walls of said housing so as to be in direct contact with the water therein, a water flow passage between the engine and pump, a valve controlling said passage and the delivery of water by the pump between the engine and radiator, said valve controlled by one of said thermosensitive means, and means connected to the other thermosensitive means to operate said first named means.

In testimony whereof we affix our signatures.

ROLAND V. HUTCHINSON.
CHARLES L. McCUEN.